(12) United States Patent
Schmitz

(10) Patent No.: US 12,145,428 B2
(45) Date of Patent: Nov. 19, 2024

(54) DEVICE FOR VENTILATING THE INTERIOR OF A MOTOR VEHICLE

(71) Applicant: MAN Truck & Bus SE, Munich (DE)

(72) Inventor: Andreas Schmitz, Munich (DE)

(73) Assignee: MAN Truck & Bus SE, Munich (DE)

( * ) Notice: Subject to any disclaimer, the term of this patent is extended or adjusted under 35 U.S.C. 154(b) by 402 days.

(21) Appl. No.: 17/618,845

(22) PCT Filed: Jun. 4, 2020

(86) PCT No.: PCT/EP2020/065440
§ 371 (c)(1),
(2) Date: Dec. 13, 2021

(87) PCT Pub. No.: WO2020/249452
PCT Pub. Date: Dec. 17, 2020

(65) Prior Publication Data
US 2022/0355649 A1  Nov. 10, 2022

(30) Foreign Application Priority Data

Jun. 13, 2019  (DE) ..................... 10 2019 004 227.1

(51) Int. Cl.
*B60J 1/20*  (2006.01)
*B60J 7/00*  (2006.01)
(Continued)

(52) U.S. Cl.
CPC ........... *B60J 1/2013* (2013.01); *B60J 1/2069* (2013.01); *B60J 7/0015* (2013.01); *B60J 7/1628* (2013.01); *B60Q 3/208* (2017.02)

(58) Field of Classification Search
CPC ...... B60J 1/2013; B60J 1/2063; B60J 1/2069; B60J 1/205; B60J 1/2052; B60J 1/007;
(Continued)

(56) References Cited

U.S. PATENT DOCUMENTS 1,713,989 A * 5/1929 Warnick ................... E06B 9/54
160/267.1
1,756,496 A * 4/1930 Warnick ................... E06B 9/54
160/269
(Continued)

FOREIGN PATENT DOCUMENTS

CN 106740007 A * 5/2017
DE 3824942 C1 10/1989
(Continued)

OTHER PUBLICATIONS

Albert (WO 2013171038 A1), machine translation (Year: 2013).*
(Continued)

*Primary Examiner* — Amy R Weisberg
*Assistant Examiner* — Wenwei Zhuo
(74) *Attorney, Agent, or Firm* — Weber Rosselli & Cannon LLP

(57) ABSTRACT

The invention relates to a device (12) for ventilating the interior of a motor vehicle, preferably a rooflight device, for a motor vehicle. The device (12) has a frame (16) with a ventilation opening (44), a first rotating element (28) for rolling up and rolling down a first roller blind (30), and a second rotating element (32) for rolling up and rolling down a second roller blind (34). The first rotating element (28) and the second rotating element (32) lie at least partially overlappingly on the same side in relation to the ventilation opening (44) and in relation to a vertical axis. The device (12) can thus preferably be designed with a particularly shallow depth in order not to restrict the headroom.

21 Claims, 3 Drawing Sheets

Figure 1:
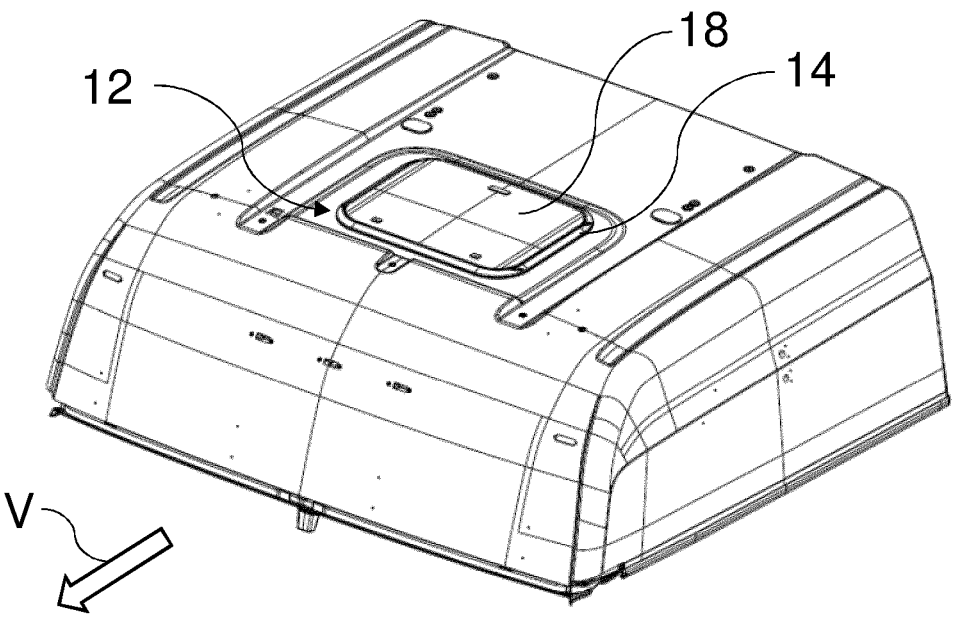

(51) Int. Cl.
*B60J 7/16* (2006.01)
*B60Q 3/208* (2017.01)

(58) Field of Classification Search
CPC ...... B60J 7/1628; B60J 7/0015; B60J 7/0007; B60J 7/047; B60Q 3/208; B60R 13/07
USPC ............ 296/214, 219, 97.4, 97.8, 141; 160/370.22, DIG. 3, DIG. 2, 120
See application file for complete search history.

(56) References Cited

U.S. PATENT DOCUMENTS

| | | | | |
|---|---|---|---|---|
| 3,990,635 | A * | 11/1976 | Restle | F24S 20/63 |
| | | | | 126/633 |
| 4,925,238 | A * | 5/1990 | Thaler | B60J 7/0015 |
| | | | | 160/267.1 |
| 5,392,835 | A * | 2/1995 | Wildt | E06B 9/17076 |
| | | | | 160/269 |
| 6,592,178 | B2 * | 7/2003 | Schober | B60J 7/05 |
| | | | | 296/214 |
| 2019/0176595 | A1 * | 6/2019 | Foss | B60J 7/0084 |
| 2021/0229534 | A1 * | 7/2021 | Han | B60J 1/2016 |
| 2023/0116705 | A1 * | 4/2023 | Schmid | B60J 1/2052 |
| | | | | 160/370.22 |

FOREIGN PATENT DOCUMENTS

| | | | | |
|---|---|---|---|---|
| DE | 102005048207 B3 * | 11/2006 | ............ | B60J 1/2041 |
| DE | 102007025145 A1 | 11/2007 | | |
| DE | 102007001735 A1 * | 7/2008 | ............ | B60J 1/2016 |
| DE | 102011113711 A1 * | 3/2013 | ............ | B60Q 3/0213 |
| DE | 102017206449 A1 | 10/2018 | | |
| EP | 3326851 A1 | 5/2018 | | |
| JP | 2008137500 A * | 6/2008 | | |
| WO | WO-2013171038 A1 * | 11/2013 | ............ | B60J 7/0015 |

OTHER PUBLICATIONS

Moussa (DE 102011113711 A1), machine translation (Year: 2013).*
Rockelmann (DE 102005048207 B3), machine translation (Year: 2006).*
Li et al. (CN 106740007 A), machine translation (Year: 2017).*
German Office Action issued in German Patent Application No. 102019004227.1 dated Mar. 24, 2020, 6 pages. English translation not available.
PCT Search Report and Written Opinion issued in PCT Application No. PCT/EP2020/065440 dated Sep. 7, 2020 with English translation of Search Report, 15 pages.
European Office Action issued in European Patent Application No. 20732145.6 dated Feb. 17, 2023 with English translation.
Notice according to B Article 94(3) EPO issued in European Patent Application No. 20732145.6 dated Mar. 20, 2024 with English translation.

* cited by examiner

DEVICE FOR VENTILATING THE INTERIOR OF A MOTOR VEHICLE

CROSS-REFERENCE TO RELATED APPLICATIONS

This application is a 371 application of PCT/EP2020/065440 filed Jun. 4, 2020, which claims benefit of and priority to German Patent Application Serial No. DE102019004227.1 filed Jun. 13, 2019, the disclosures of the above-identified applications are hereby incorporated by reference in their entirety.

The present disclosure relates to a device, vehicle preferably a roof hatch device, for ventilating the interior of a motor vehicle, preferably a utility vehicle.

Most driver's cabs of trucks have openable roof hatches for ventilating and aerating the driver's cab. If this roof hatch is transparent, it can be useful to shade the transparent surface. On the one hand, this can protect the driver/occupants from sun glare. On the other hand, the driver's cab can be protected against heating. There may also be a need to prevent insects from entering when the roof hatch is open. It is also possible to provide interior lighting in the region of the roof lining of the driver's cab, which lighting is used to illuminate the driver's cab.

DE 10 2007 025 145 A1 discloses a multi-part panoramic roof for trucks with improved lighting conditions in a driver's cab and an enhanced sense of space for the driver and passengers. The panoramic roof can be shielded from solar radiation by a blackout blind. The opening roof hatch of the panoramic roof is additionally protected by way of a fly screen against the unwanted entry of insects.

The present disclosure is based on the problem of creating an alternative and/or improved device for interior ventilation, in particular for a motor vehicle.

The problem is solved by the features of independent claim 1. Advantageous refinements are given in the dependent claims and the description.

The present disclosure provides a device, preferably a roof hatch device, for ventilating the interior of a motor vehicle, preferably a utility vehicle (for example, truck or bus). The device comprises a (for example, rectangular) frame with a (for example, central) ventilation opening (or ventilation and aeration opening). The device comprises a first rotating element (for example, take-up roller) for rolling up and unrolling a first roller blind attached to the first rotating element for selectively uncovering or covering the ventilation opening. The device comprises a second rotating element (for example, take-up roller) for rolling up and unrolling a second roller blind attached to the second rotating element for selectively uncovering or covering the ventilation opening. The first rotating element and the second rotating element are arranged at least partially overlappingly on a common (same) side in relation to the ventilation opening and (for example, in an installation situation) in relation to a (imaginary) vertical axis.

The device can offer the advantage of making optimum use of the only limited installation space available for accommodating the rotating elements. The device can be of a design projecting downwardly to a minimal extent because the rotating elements are arranged next to each other and not on top of each other. This means that the headroom in the driver's cab of a truck, for example, is not restricted. In addition, the transparent region of the roof hatch can be covered to a minimal extent by the rotating elements.

In one exemplary embodiment, the first rotating element and the second rotating element are arranged substantially at the same height. It is possible that the first rotating element and the second rotating element are arranged next to each other with respect to a (imaginary) horizontal axis. It is also possible that the first roller blind can be unrolled above the second roller blind. The device can thus reduce the required installation space in the vertical direction to the greatest possible extent without having to dispense with a roller blind.

In another exemplary embodiment, the device comprises a spacer arranged above, preferably directly above, the second rotating element for guiding the first roller blind spaced from the second roller blind and/or the second rotating element. The spacer can prevent the roller blinds from rubbing or dragging against each other. For example, a fly screen roller blind arranged at the top can be prevented from rubbing on a suitably coated lower shading roller blind. This can prevent damage due to abrasion.

In a refinement, the spacer is rib-, rod-, bar- or beam-shaped, preferably in a direction parallel to the first rotating element and/or the second rotating element. In this way, the spacer can, for example, ensure spacing between the roller blinds over the entire width of the roller blinds.

In a further exemplary embodiment, the spacer is ramp-shaped, preferably in a direction away from the first rotating element. This allows the first roller blind to be guided, for example, to a lateral guide for the first roller blind, which guide is arranged higher than the first rotating element.

In another exemplary embodiment, the spacer is designed to guide the first roller blind from below, preferably by means of a top sliding surface. This prevents damage to the first roller blind when it slides along the spacer.

In one embodiment, the device comprises an interior lighting means preferably arranged on an opposite side of the ventilation opening in relation to the first and second rotating elements. The device can expediently further comprise a splash guard element for keeping liquid which enters the device from above (for example rainwater through an open hatch of the device) away from the interior lighting means. For example, the splash guard element can be spaced apart from the interior lighting means above the interior lighting means. The splash guard element can protect the interior lighting means mounted in the roof hatch trim from possible water intrusion when the roof hatch is open.

In a refinement, the device has a cover (for example, a trim piece) that is attached to the frame, for example, from below. The cover can have a recess (for example, mounting opening) in which the interior lighting means is arranged. For example, the cover can further comprise a projection (for example, rib-shaped) surrounding the recess for keeping liquid (for example, rainwater) which enters the device from above away from the interior lighting means.

In a further embodiment, the splash guard element is shaped, preferably in a sloping manner (for example, sloping away from the ventilation opening), such that liquid (for example, rainwater) located on an upper side of the splash guard element is directed into a region outside the circumferential projection. In this way, the liquid can be particularly safely prevented from reaching the interior lighting means.

In a further embodiment, the spacer and/or the splash guard element is integrally formed with the frame, preferably by means of (for example plastic) injection molding. This means that no extra additional components need to be provided and attached for these functions. In addition, the spacer and/or the splash guard element can increase a rigidity of the frame.

In one variant, the frame comprises a frame leg having a handle opening for handling the frame during an assembly of the frame. Preferably, the handle opening can be arranged on an opposite side of the ventilation opening in relation to the first and second rotating elements. This allows the frame to be deliberately gripped during transport/handling without risking damage to the kinematics, i.e., the rotating elements.

In a further variant, the device further comprises a (for example, manually or automatically) movable (for example, transparent) hatch, preferably a roof hatch.

In a further refinement, the device has a drive unit for opening and/or closing the hatch. Preferably, the drive unit can be arranged at least partially in the handle opening. This means that no installation space is wasted by the handle opening for transport, etc. Instead, the handle opening can also serve as a functionally integrated holding space for the drive unit in the assembled state.

Expediently, the frame with the first rotating element and second rotating element mounted thereon (together with the first and second roller blinds) can form a pre-assembly unit.

In one exemplary embodiment, the frame comprises a frame leg, preferably transverse to the first and second rotating elements. Preferably, a control unit for a drive unit of a hatch of the device is attached on the frame leg. The frame, together with the control unit mounted thereon, can thus form a pre-assembly unit that is as comprehensive as possible.

Preferably, the term "control unit" can refer to an electronic unit (for example, with microprocessor(s) and data memory) and/or mechanical control unit which, depending on the design, can perform open-loop and/or closed-loop control tasks. Where the term "control" is used herein, "closed-loop control" or "control with feedback" can also be included expediently.

In another exemplary embodiment, the second roller blind is holdable on the first roller blind, preferably for rolling up and/or unrolling together and/or for holding the second roller blind in a rolled-out state.

In a refinement, the second roller blind has a handle element, preferably a handle strip, which can be held on a handle element, preferably a handle strip, of the first roller blind.

In one embodiment, the first roller blind and/or the second roller blind is an insect guard roller blind, preferably a mesh insect guard roller blind, and/or a blackout roller blind or shade roller blind.

In another embodiment, the first rotating element and the second rotating element are arranged parallel to each other.

In another embodiment, the first rotating element and/or the second rotating element is rotatably mounted on the frame.

It is possible that the frame has two opposing, first guides, preferably guide rails or guide grooves, for guiding the first roller blind. Alternatively or additionally, the frame can have two opposing, second guides, preferably guide rails or guide grooves, for guiding the second roller blind. Preferably, the two first guides can be arranged above the two second guides.

The present disclosure also relates to a motor vehicle, preferably a utility vehicle (for example truck or bus). The motor vehicle comprises a device as disclosed herein, which is preferably arranged such that the first and second rotating elements are arranged in front of the ventilation opening in relation to a forward driving direction of the motor vehicle and/or on a side of the device facing in the forward driving direction of the motor vehicle.

Preferably, the device is a truck roof hatch device for the driver's cab of a truck.

It is also possible to use the device as disclosed herein for passenger cars, off-road vehicles, or caravans.

Figure 2:
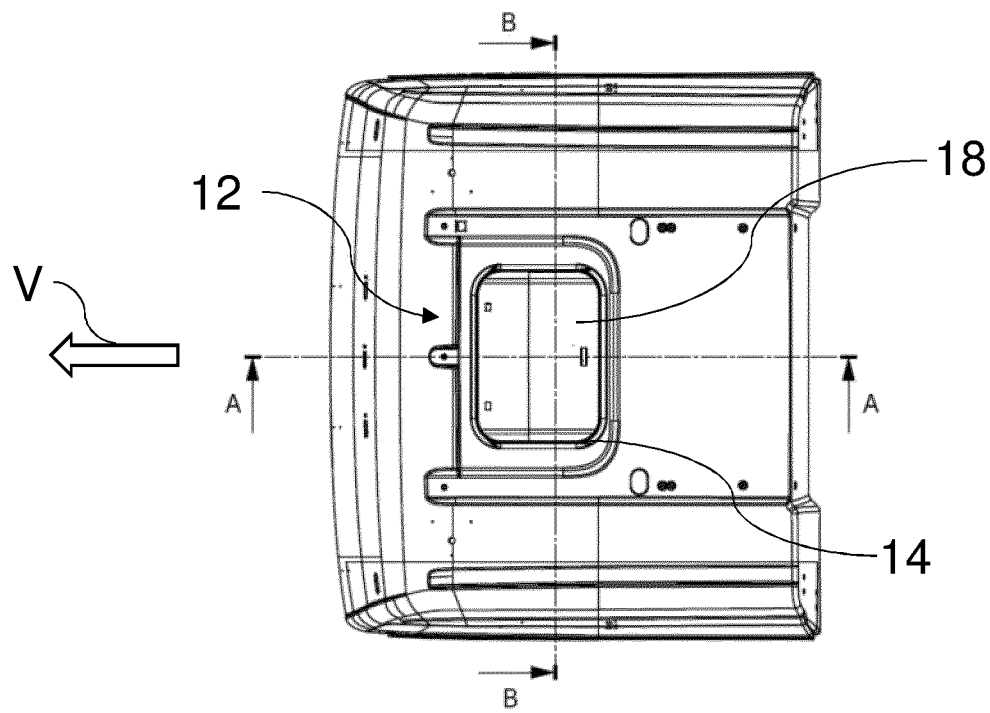
Figure 3:
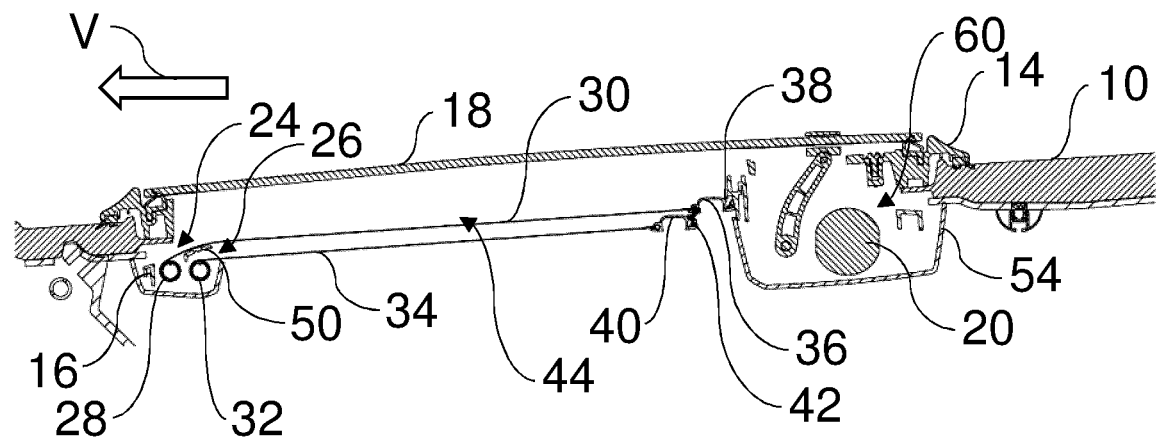
Figure 4:
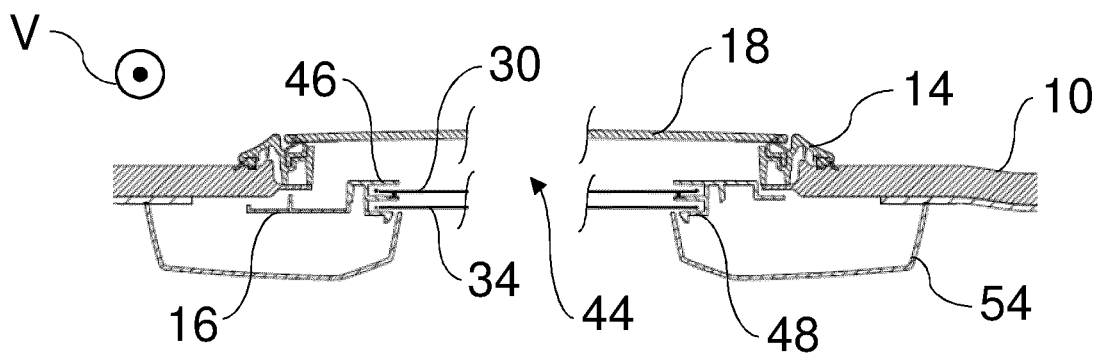
Figure 5:
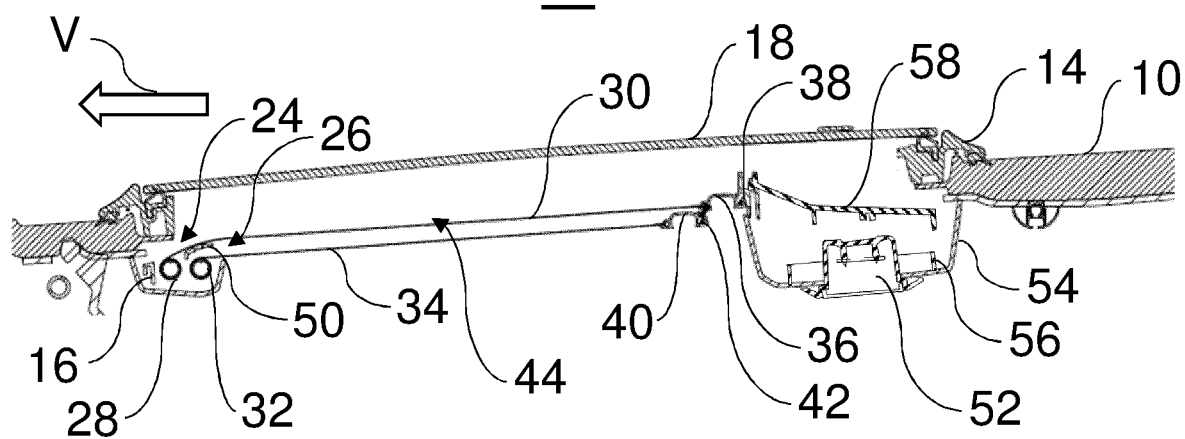
Figure 6:
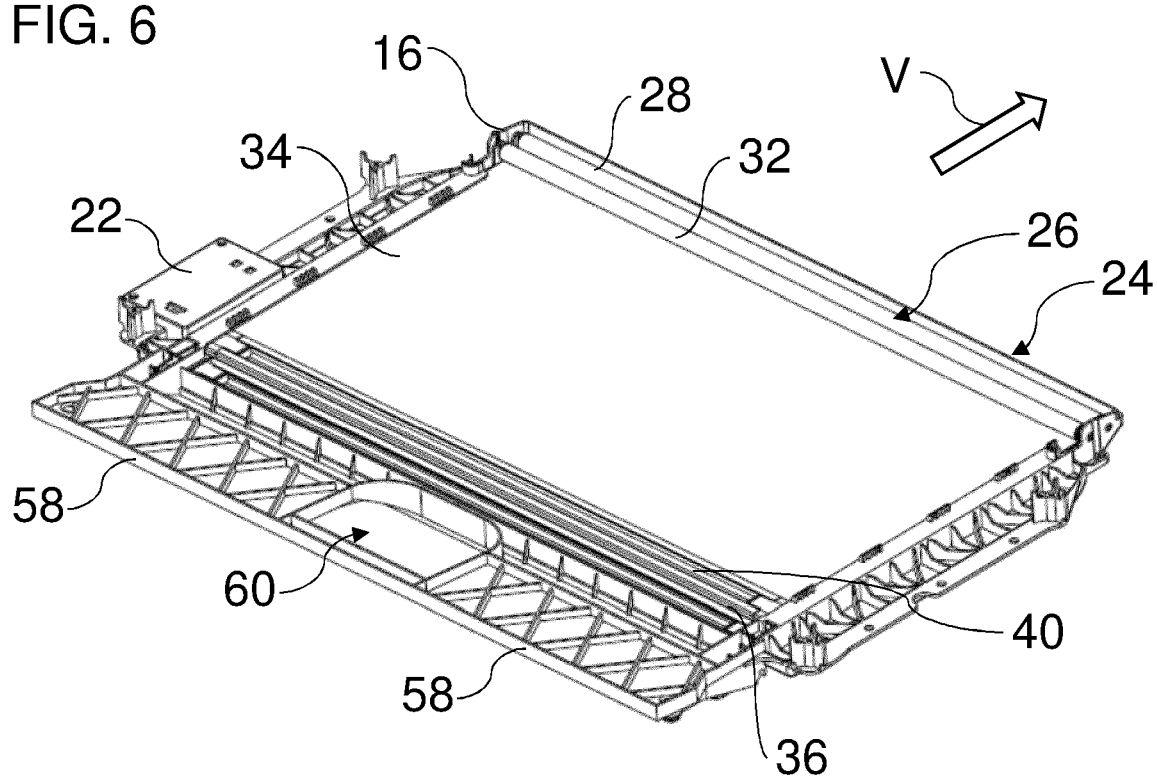

The preferred embodiments and features of the present disclosure described above can be combined with each other in any desired manner. Further details and advantages of the present disclosure are described below with reference to the accompanying drawings, which show:

FIG. 1 a perspective view of a roof region of a utility vehicle;

FIG. 2 a plan view of the roof region of FIG. 1;

FIG. 3 a sectional view along a line A-A in FIG. 2;

FIG. 4 a sectional view along a line B-B in FIG. 2;

FIG. 5 a sectional view in a plane parallel to the line A-A in FIG. 2 or parallel to the sectional view of FIG. 3;

FIG. 6 a perspective view from below of a part of a device for ventilating the interior of a motor vehicle according to an exemplary embodiment of the present disclosure; and FIG. 7 a perspective view from above of the exemplary part of the device for interior ventilation.

The embodiments shown in the figures correspond at least in part, so that similar or identical parts are provided with the same reference signs and reference is also made to the description of the other embodiments or figures for their explanation in order to avoid repetitions.

FIGS. 1 and 2 show a roof region 10 of a motor vehicle. A forward direction of travel of the motor vehicle is indicated by an arrow V. The roof region 10 comprises a device 12 for interior ventilation (supply and removal of air). Specifically, the roof region 10 in the exemplary embodiment shown is a roof region of the driver's cab of a truck. The device 12 is thus used for roof-side cab ventilation of a driver's cab. The device 12 is configured as a roof hatch device. It is possible to use the device 12 in a different environment, for example, in another vehicle such as a passenger car or a campervan.

FIGS. 3 to 7 illustrate the device 12 in greater detail.

The device 12 is mounted at an opening in the roof region 10. Specifically, the device 12 comprises a first frame 14 and a second frame 16. The first frame 14 is sealingly fastened to an upper side of the roof region 10. The second frame 16 is fastened to a bottom side of the roof region 10. Expediently, the second frame 16 is disposed as an interior component on the roof lining of a driver's cab. The first and second frames 14 and 16 can be bolted to each other, for example. The first and/or second frames 14, 16 can be substantially rectangular in shape. The first and/or the second frame 14, 16 can expediently be plastic parts, preferably manufactured by means of plastic injection molding.

A movable, preferably pivotable or tiltable and/or slidable (roof) hatch 18 is positioned in a central opening of the first frame 14. Preferably, the hatch 18 can be opened and closed automatically. For automatic movement of the hatch 18, an electric drive unit 20 (see FIG. 3), for example, can be included. The electric drive unit 20 can be connected to the hatch 18 in a driving manner, for example via a pivot lever or the like.

Figure 7:
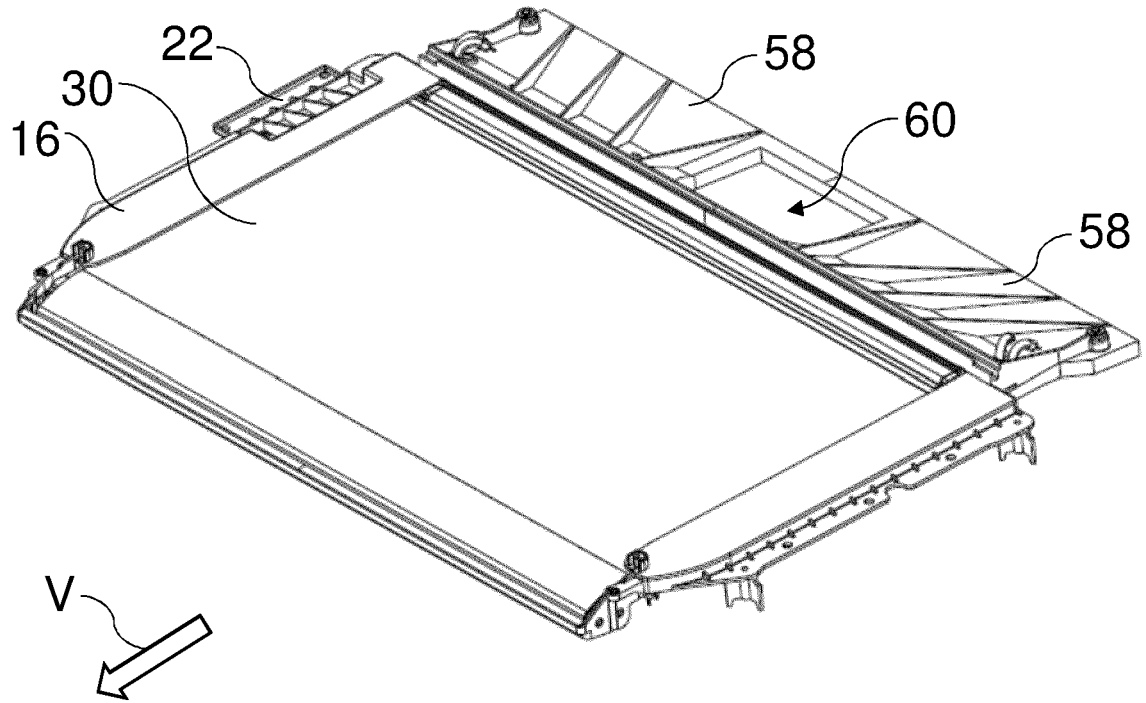

The drive unit 20 can be operated by a control unit 22 (see FIGS. 6 and 7). The control unit 22 can also be included in the device 12. Expediently, the control unit 22 is attached to the second frame 16 so that the second frame 16 with the components mounted thereon can form as comprehensive a pre-assembly unit as possible. However, it is also possible for the hatch 18 to be opened and closed manually.

The device 12 comprises a first roller blind device 24 and a second roller blind device 26. The first roller blind device 24 comprises a first rotating element 28 and a first roller blind 30. The second roller blind device 26 comprises a second rotating element 32 and a second roller blind 34. The first rotating element 28 and the second rotating element 32 are each bar-shaped. The first rotating element 28 and the second rotating element 32 are each rotatably mounted on the second frame 16. The rotating elements 28, 32 are expediently each designed as a takeup roller. The roller blinds 30, 34 are expediently designed as rollable, for example rectangular, cloths, fabrics, foils or the like. The rotating elements 28, 32 can be covered from below by means of a cover attached to the second frame 16.

The first roller blind 30 is attached, preferably fastened, to the first rotating element 28 at a first end side. On an opposite end side, the first roller blind 30 comprises a handle element 36 in the form of a handle strip. The first roller blind 30 can be rolled up on the first rotating element 28 and unrolled from the first rotating element 28. The first roller blind 30 can be gripped at the handle element 36 and manually unrolled from the first rotating element 28. The handle element 36 can be releasably held on a fixture 38 of the second frame 16 to hold the first roller blind 30 in the unrolled state. For example, the handle element 36 can be hooked to the fixture 38.

The first rotating element 28 can be biased, preferably spring-biased, in a direction of rotation for rolling up the first roller blind 30. The first roller blind 30 can expediently be a mesh insect guard roller blind. When unrolled, the mesh insect guard roller blind can prevent insects from entering the interior of the motor vehicle through the open hatch 18.

The second roller blind 34 is attached, preferably fastened, to the second rotating element 32 at a first end side. At an opposite end side, the second roller blind 34 has a handle element 40 in the form of a handle strip. The second roller blind 34 can be rolled up on the second rotating element 32 and unrolled from the second rotating element 32. The second roller blind 34 can be gripped at the handle element 40 and manually unrolled from the second rotating element 32. The handle element 40 can be releasably held on a fixture 42 of the first roller blind 30, preferably the handle element 36 of the first roller blind 30. Thus, the second roller blind 34 can be held in the unrolled state or can be unrolled or rolled up together with the first roller blind 30. For example, the handle element 40 can be hooked into the fixture 42.

The second rotating element 32 can be biased, preferably spring-biased, in a direction of rotation for rolling up the second roller blind 34. The second roller blind 34 can expediently be a blackout or shade roller blind. When unrolled, the second roller blind can prevent sunlight from entering the interior of the motor vehicle through the transparent hatch 18.

As described, the roller blinds 30, 34 can be opened manually. However, it is also possible that the first roller blind 30 and/or the second roller blind 34 can be automatically rolled up and unrolled in each case by means of a dedicated drive unit (not shown). The drive unit(s) can, for example, be drivingly connected to the first rotating element 28 and/or the second rotating element 32.

The second frame 16 has a ventilation opening 44. The ventilation opening 36 is disposed below the hatch 18, which can be opened. When rolled up, the first roller blind 30 and the second roller blind 34 can each uncover the ventilation opening 44. When unrolled, the first roller blind 30 and the second roller blind 34 can each cover the ventilation opening 44. FIGS. 3 to 7 show the roller blinds 30, 34 each in the unrolled state.

As shown, for example, in FIG. 4, the roller blinds 30, 34 can each be guided on both sides in lateral guides 46, 48 when being rolled up and unrolled. The first guide 46 for the first roller blind 30 is arranged directly above the second guide 48 for the second roller blind 34. The guides 46, 48 can be integrally made in one piece with the second frame 16. The guides 46, 48 can, for example, be designed as guide grooves or guide rails.

The rotating elements 28, 32 are arranged side by side at the same height on the same side in relation to the ventilation opening 44. The rotating elements 28, 32 are arranged one behind the other in the forward travel direction V on the side of the ventilation opening 44 or of the second frame 16 facing the forward travel direction V. This arrangement of the rotating elements 28, 32 one behind the other allows for a shallow device 12. The passenger interior can be restricted minimally in the upper region by the device 12. This can have an advantageous effect on a maximum possible seating or standing height in the motor vehicle.

As shown in FIGS. 3 and 5, the device 12 can comprise a spacer 50. The spacer 50 spaces the first roller blind 30 from the second roller blind 34 in the region of the second rotating element 32. The spacer 50 is arranged above the second rotating element 32. The spacer 50 is arranged parallel to the first rotating element 28 and the second rotating element 32. The spacer 50 is arranged on the same side in relation to the ventilation opening 44 as the rotating elements 28, 32. The spacer 50 can be beam-, bar-, rib- or strip-shaped, for example, and can extend along an entire width of the first roller blind 30.

The spacer 50 is designed as a guide piece or sliding piece. The spacer 50 guides and supports the first roller blind 30 from below. The first roller blind 30 can slide over an expediently smooth upper side of the spacer 50. The spacer 50 can prevent the first roller blind 30 from rubbing or dragging against the second roller blind 34. For example, a roller blind fabric or a roller blind coating can be protected from damage. The spacer 50 can be ramped in a direction away from the first rotating element 28. The first roller blind 30 can thus be guided to the guides 46, which are arranged higher than the first rotating element 28. The spacer 50 can be formed integrally in one piece with the second frame 16, preferably molded thereon.

As shown in FIG. 5, the device 12 can comprise an interior lighting means 52. By means of the interior lighting means 52, a vehicle interior of the motor vehicle can be illuminated. The interior lighting means 52 is mounted on a mounting opening or recess of a cover (trim) 54. The cover 54 is fastened to the second frame 16 from below.

Spaced from the mounting opening, the cover 54 can have an upwardly directed projection 56 on the inner side that surrounds the mounting opening. A splash guard element 58 (see also FIGS. 6 and 7) can be disposed above the interior lighting means 52. The splash guard element 58 is arranged and shaped to prevent liquid, such as rainwater, which enters through the open hatch 18, from reaching the interior lighting means 52. Liquid can drip from above onto an upper side of the splash guard element 58. The upper side extends downwardly in a sloping manner and directs the penetrated liquid into a region externally of the circumferential projection 56. This makes it possible to protect the electrics of the interior lighting means 52 from the liquid. The splash guard element 58 can be formed integrally in one piece with the second frame 16, preferably molded thereon. The splash guard element 58 can thus be in the form of a frame extension, which can also increase the rigidity of the second frame 16.

As shown in FIGS. 6 and 7, the second frame 16 can comprise a handle opening 60. By means of the handle opening 60, the second frame 16 can be handled without damage during transportation and assembly. The handle opening 60 can be disposed in a frame leg of the second frame 16 on a side of the second frame 16 opposite the rotating elements 28, 32. The handle opening 60 can be centrally disposed in the frame leg. The handle opening 60 can be centrally disposed between two splash guard elements 58, each of which covers an interior lighting means 52. In the assembled state, the handle opening 60 can serve to provide installation space for the drive unit 20, which can be arranged at least partially in the handle opening 60.

The present disclosure is not limited to the preferred exemplary embodiments described above. Rather, a large number of variants and variations are possible which also make use of the inventive concept and therefore fall within the scope of protection. In particular, the present disclosure also claims protection for the subject matter and features of the dependent claims independently of the referenced claims. In particular, the individual features of independent claim 1 are each independently disclosed. In addition, the features of the dependent claims are also disclosed independently of all of the features of independent claim 1 and, for example, independently of the features relating to the presence and/or configuration of the frame, the first rotating element and/or the second rotating element of independent claim 1.

LIST OF REFERENCE SIGNS 10 roof region
12 device for interior ventilation
14 first frame
16 second frame
18 hatch
20 drive unit
22 control unit
24 first roller blind unit
26 second roller blind unit
28 first rotating element
30 first roller blind
32 second rotating element
34 second roller blind
36 handle element
38 fixture
40 handle element
42 fixture
44 ventilation opening
46 first guide
48 second guide
50 spacer
52 interior lighting means
54 cover
56 projection
58 splash guard element
60 handle opening

The invention claimed is:

1. A device for ventilating the interior of a motor vehicle said device comprising:
  a frame with a ventilation opening,
  wherein the frame comprises a frame leg having a handle opening for handling the frame during an assembly of the frame;
  a first rotating element for rolling up and unrolling a first roller blind attached to the first rotating element for selectively uncovering or covering the ventilation opening;
  a second rotating element for rolling up and unrolling a second roller blind attached to the second rotating element for selectively uncovering or covering the ventilation opening,
  wherein the first rotating element and the second rotating element are arranged at least partially overlappingly on a common side in relation to the ventilation opening and in relation to a vertical axis;
  a movable hatch; and
  a drive unit for opening and/or closing the hatch, wherein the drive unit is arranged at least partially in the handle opening.

2. The device as claimed in claim 1, wherein:
the device is a roof hatch device; or
the motor vehicle is a utility vehicle.

3. The device as claimed in claim 1, wherein:
the first rotating element and the second rotating element are arranged substantially at the same height; or
the first rotating element and the second rotating element are arranged next to each other with respect to a horizontal axis; or
the first roller blind can be unrolled above the second roller blind.

4. The device as claimed in claim 1, further comprising:
a spacer arranged above the second rotating element for guiding the first roller blind spaced from the second roller blind and/or the second rotating element.

5. The device as claimed in claim 4, wherein:
the spacer is arranged directly above the second rotating element; or
the spacer is rib-, rod-, bar- or beam-shaped; or
the spacer is ramp-shaped; or
the spacer is designed to guide the first roller blind from below.

6. The device as claimed in claim 5, wherein:
the spacer is rib-, rod-, bar- or beam-shaped in a direction parallel to the first rotating element or the second rotating element; or
the spacer is ramp-shaped in a direction away from the first rotating element; or
the spacer is designed to guide the first roller blind from below by means of a top sliding surface.

7. The device as claimed in claim 1, further comprising:
an interior lighting means; and
a splash guard element for keeping liquid which enters the device from above away from the interior lighting means, wherein the splash guard element is spaced apart from the interior lighting means above the interior lighting means.

8. The device as claimed in claim 7, wherein:
the interior lighting means is arranged on an opposite side of the ventilation opening in relation to the first and second rotating elements.

9. The device as claimed in claim 7, further comprising:
a cover that is attached to the frame from below, wherein the cover has a recess, in which the interior lighting means is arranged, and on the inner side has a projection surrounding the recess for keeping liquid which enters the device from above away from the interior lighting means.

10. The device as claimed in claim 9, wherein:
the splash guard element is shaped such that liquid located on an upper side of the splash guard element is directed into a region outside the circumferential projection.

11. The device as claimed in claim 10, wherein:
the splash guard element is shaped in a sloping manner.

12. The device as claimed in 4, wherein
the spacer is integrally formed with the frame; or
a splash guard element is integrally formed with the frame.

13. The device as claimed in claim 12, wherein:
the spacer is integrally formed with the frame by means of injection molding; or
the splash guard element is integrally formed with the frame by means of injection molding.

14. The device as claimed in claim 1, wherein: the frame leg is attached to a control unit for the drive unit of the hatch of the device.

15. The device as claimed in claim 1, wherein:
the second roller blind is holdable on the first roller blind.

16. The device as claimed in claim 15, wherein:
the second roller blind is holdable on the first roller blind for rolling up and/or unrolling together and/or for holding the second roller blind in a rolled-out state; or
the second roller blind has a handle element which can be held on a handle element of the first roller blind.

17. The device as claimed in claim 16, wherein:
the handle element of the first roller blind and/or the handle element of the second roller blind is a handle strip.

18. The device as claimed in claim 1, wherein:
the first roller blind and/or the second roller blind is an insect guard roller blind and/or a blackout roller blind or shade roller blind; or
the first rotating element and the second rotating element are arranged parallel to each other; or
the first rotating element and/or the second rotating element is rotatably mounted on the frame.

19. The device as claimed in claim 1, wherein: the handle opening arranged on an opposite side of the ventilation opening in relation to the first and second rotating elements; or
the frame comprises a frame leg transverse to the first and second rotating elements, on which frame leg there is attached a control unit for the drive unit of the hatch of the device; or
the first roller blind and/or the second roller blind is a mesh insect guard roller blind.

20. A motor vehicle comprising:
a device as claimed in claim 1.

21. The motor vehicle as claimed in claim 20 wherein:
the motor vehicle is a utility vehicle; or
the device is arranged such that the first and second rotating elements are arranged in front of the ventilation opening in relation to a forward driving direction of the motor vehicle and/or on a side of the device facing in the forward driving direction of the motor vehicle.

* * * * *